Patented Nov. 14, 1939

2,179,809

UNITED STATES PATENT OFFICE 2,179,809

CONDENSATION PRODUCTS

Wilhelm Bockemüller, Wurzburg, Germany, assignor to Winthrop Chemical Company, Inc., New York, N. Y., a corporation of New York No Drawing. Application December 31, 1937, Serial No. 182,606. In Germany January 4, 1937

6 Claims. (Cl. 260—397)

This invention relates to condensation products of 1-methyl-cyclopentene-(1)-one-(5) with compounds having a system of two reactive conjugated double bonds and to a process of preparing the said condensation products.

Cyclic ketones which are unsaturated in the α,β-position to the keto group have a tendency to undergo auto condensation with the formation of resinous products. This tendency is increasing from the cycloheptenone over the cyclohexenone to the cyclopentenone.

Cyclopentadienones are likewise known to form auto condensation products, for instance, two molecules of tetrachloro-cyclopentadienone combine with one another according to the reaction mechanism of the so-called diene-synthesis in accordance with the following reaction scheme:

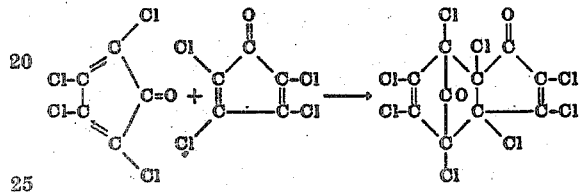

The reaction product is again a cyclic ketone containing in a cyclopentenone ring a double bond in α,β-position to the keto group, but this product is not known to undergo further condensation with tetrachloro-pentadienone according to the mechanism of the diene synthesis.

In view of the known facts it is most surprising that in accordance with the present invention 1-methyl-cyclopentene-(1)-one-(5) reacts with diene compounds having a system of two conjugated double bonds, for instance, according to the following reaction scheme:

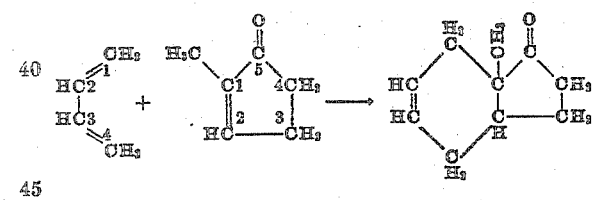

In the new condensation products the nuclear carbon atoms 1 and 2 of the 1-methyl-cyclopentene-(1)-one-(5) are linked to the 2-carbon atoms in the 1- and 4-positions of the conjugated double bond system while forming a six-membered carbon ring.

Suitable diene compounds are for instance butadiene and its substitution products, such as methyl- and dimethyl-butadiene, furthermore, cyclic compounds which either contain the two reactive double bonds in conjugated position in a carbocyclic ring or contain one double bond in a carbocyclic ring and the other double bond in an aliphatic side chain in conjugated position to the said ring double bond, for instance in a vinyl or propenyl side chain. Suitable compounds of this kind are for instance 1-vinyl-cyclohexene-(1)-compounds, furthermore, 1-vinyl-3,4-dihydro-naphthalene-compounds, and the like. When using these compounds in the reaction two formulae are possible for the reaction products, for instance, the product obtained from 1-vinyl-3,4-dihydro-naphthalene and 1-methyl-cyclopentene-(1)-one-(5) may have one of the following formulae:

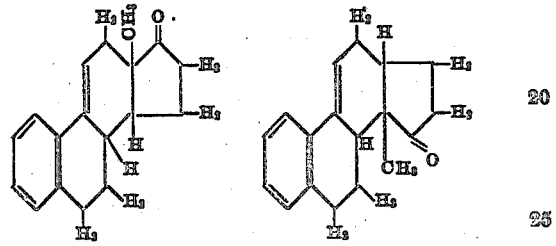

It cannot be decided at this time which of the two formulae is to be attributed to those compounds in which the six-carbon ring formed in the reaction contains substituents in asymmetric positions. Generally spoken, the new condensation products contain a cyclopentanone ring condensed with a six-carbon ring a carbon atom which is common to both rings being substituted by a methyl group.

The condensation is performed with heating and it is surprising that even temperatures of about 200° C. may be used. For effecting the condensation described the reaction is advantageously carried out in an inert atmosphere, for instance, carbon dioxide or nitrogen atmosphere in a closed pressure vessel. The 1-methyl-cyclopentene-(1)-one-(5) is suitably used in excess so that it simultaneously serves as a diluent, but also other suitable solvents or diluents may be employed.

The products employed in accordance with the present invention are of general commercial interest. Those compounds containing the cyclopentenone ring condensed with the phenanthrene ring system are of particular interest with respect to the synthesis of hormone-like substances; for instance, by the condensation of 1-methyl-cyclopentene-(1)-one-(5) with 1-vinyl-6-methoxy-3,4-dihydronaphthalene and saponiification of the methoxy group in the condensation product formed oestrone-like products are obtained.

The invention is further illustrated by the following examples without being restricted thereto:

Example 1.—40 parts by weight of 1-methyl-cyclopentene-(1)-one-(5) are heated with 20 parts by weight of 2,3-dimethyl-butadiene in a carbon dioxide atmosphere for 15 hours at 200° C. The reaction product is subjected to fractional distillation. The trimethyl-tetrahydro-indanone of the formula:

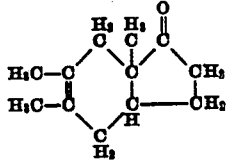

is obtained in the form of a colorless oil boiling at 129 to 130° C. under 12 mm. pressure.

Example 2.—2.3 parts by weight of 1-vinyl-cyclohexene-(1) are heated with 10 parts by weight of 1-methyl-cyclopentene-(1)-one-(5) in a nitrogen atmosphere in a pressure vessel for 16 hours at 170° C. When subjecting the reaction product to fractional distillation, 2.2 parts by weight of the condensation product having one of the formulae

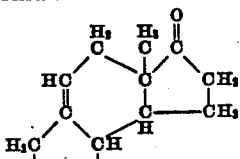

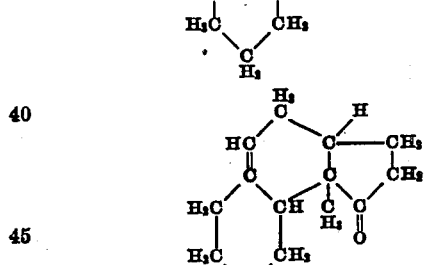

are obtained in the form of a colorless oil which boils at 104 to 105° C. under 0.1 mm. pressure. The first running of the distillation may be used in another condensation reaction.

Example 3.—7 parts by weight of 1-vinyl-cyclohexene-(1) are heated in a pressure vessel with 22 parts by weight of 1-methyl-cyclopentene-(1)-one-(5) in a nitrogen atmosphere for 24 hours at 205° C. On fractional distillation 10.2 parts by weight of the condensation product are again obtained as a colorless oil boiling at 104 to 105° C. under 0.1 mm. pressure.

Example 4.—15 parts by weight of 1-vinyl-3,4-dihydro-naphthalene are heated with 50 parts by weight of 1-methyl-cyclopentent-(1)-one-(5) in a nitrogen atmosphere for 22 hours at 160° C. On fractional distillation of the reaction mixture under reduced pressure the condensation product which has one of the formulae indicated on page 1, column 2, boils at 160 to 180° C. under 0.05 mm. pressure.

With dinitrophenyl-hydrazone yellow crystals of the dinitrophenyl-hydrazone of the condensation product are obtained which melt at 186 to 189° C.

The 1-vinyl-3,4-dihydronaphthalene is prepared as follows:

A solution of 25 grams of 1-keto-1,2,3,4-tetrahydronaphthalene in 150 ccs. of dioxane is saturated with acetylene in a pressure vessel at room temperature, 12 g. of sodium-acetylenide are added and the mixture shaken for 40 hours at about 50° C. Then the mixture is poured into a solution of 20 ccs. of acetic acid in 400 ccs. of water. The oil which has precipitated is extracted with methylene chloride and the methylene chloride solution freed from the methylene chloride after drying with calcium chloride. On fractional distillation of the residue the 1-acetylenyl-1-hydroxy-1,2,3,4-tetrahydronaphthalene is contained in the fraction boiling at 136 to 150° C. under 12 mm. pressure. For removing certain quantities of the starting material, the reaction product is treated with phenyl hydrazine, ether is then added to the mixture, the ethereal solution washed with water, dilute acetic acid and sodium bicarbonate solution and dried with calcium chloride. The ether is then removed and the residue fractionated. The 1-acetylenyl-1-hydroxy-1,2,3,4-tetrahydronaphthalene boils under 0.2 mm. pressure at 102 to 104° C. (yield about 15 g.).

15 grams of the product obtained are dissolved in 150 ccs. of 80% alcohol and heated to boiling under reflux for 7 hours with 30 g. of coppered zinc dust. The cold, clear solution is poured off from the sludge, the latter three times extracted with 50 ccs. of ether, then sucked off and washed with 50 ccs. of warm ether. The combined solutions are diluted with 350 ccs. of water, the ethereal layer is separated off, dried with sodium sulfate and the solvent distilled off under reduced pressure. The 1-vinyl-1-hydroxy-1,2,3,4-tetrahydronaphthalene is obtained from the residue by fractional distillation in the form of a colorless oil boiling under 0.1 mm. pressure at 93 to 95° C. (yield about 12 g.).

A solution of 5 g. of the 1-vinyl-1-hydroxy-1,2,3,4-tetrahydronaphthalene, 0.1 g. of hydroquinone and 0.1 g. of pyrogallol in 50 ccs. of ether are gradually added to a suspension of 10 g. of phosphorus pentoxide in 100 ccs. of ether. The mixture is shaken for a short time, whereupon the phosphorus pentoxide forms lumps. Then again 5 g. of phosphorus pentoxide are added. After 45 minutes' further shaking, the clear solution is filtered, the phosphorus pentoxide washed with ether and the ether removed under reduced pressure. 2.6 g. of 1-vinyl-3,4-dihydronaphthalene are obtained from the residue by fractional distillation in the form of a light oil boiling under 0.1 mm. pressure at 62 to 63° C.

I claim:

1. The process which comprises reacting upon a compound having a system of two reactive conjugated double bonds with 1-methyl-cyclopentene-(1)-one-(5) while heating.

2. The process which comprises reacting upon a carbocyclic compound a six-carbon-ring of which contains a reactive double bond in conjugated position to the double bond of a vinyl substituent with 1-methyl-cyclopentene-(1)-one-(5) while heating.

3. The process which comprises reacting upon a 1-vinyl-3,4-dihydronaphthalene with 1-methyl-cyclopentene-(1)-one-(5) while heating.

4. The condensation products of 1-methyl-cyclopentene-(1)-one-(5) with compounds containing a system of two reactive conjugated double bonds in which condensation products the nuclear carbon atoms 1 and 2 of the said 1-methyl-cyclopentene-(1)-one-(5) are linked to the two carbon atoms in the 1- and 4-position of the conjugated system while forming a six-membered carbon ring.

5. The condensation products of 1-methyl-cyclopentene-(1)-one-(5) with compounds containing a system of two reactive conjugated double bonds, one of which is contained in a vinyl group substituting a carbocyclic ring system which latter contains in a six-carbon-ring the other double bond in conjugated position to the double bond of the vinyl group, in which condensation products the nuclear carbon atoms 1 and 2 of the said 1-methyl-cyclopentene-(1)-one-(5) are linked to the two carbon atoms in the 1- and 4-position of the conjugated system while forming a six-membered carbon ring.

6. The condensation products of 1-methyl-cyclopentene-(1)-one-(5) with a 1-vinyl-3,4-dihydronaphthalene, which condensation products have the 1,2-cyclopentano-phenanthrene ring system.

WILHELM BOCKEMÜLLER.